P. KREFTING.
ELECTRIC FURNACE WORKING WITH AN ELECTRIC ARC OR ARCS FOR MELTING AND EXTRACTION OF METAL FROM ORE.
APPLICATION FILED APR. 3, 1911.
1,097,336.
Patented May 19, 1914.
3 SHEETS—SHEET 1.
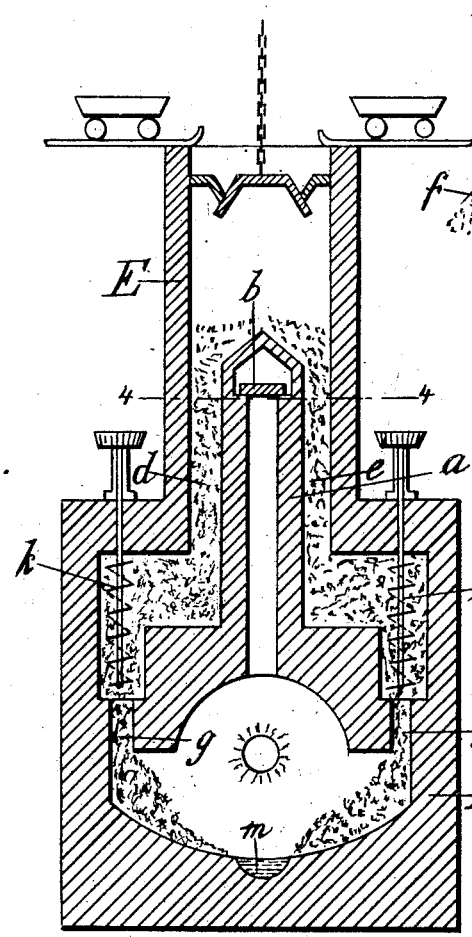
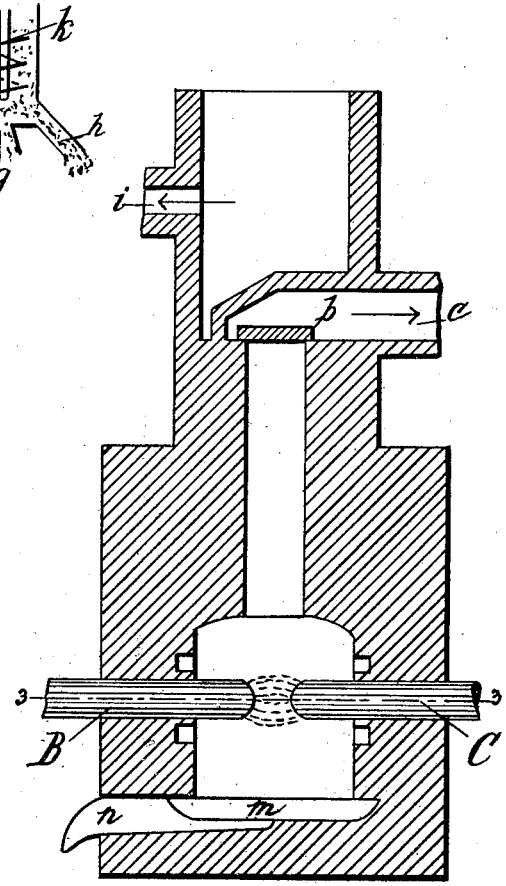
Witnesses
C. Heymann
M. Schmid
Inventor:
Peter Krefting
by B. Singer
att'y P. KREFTING.
ELECTRIC FURNACE WORKING WITH AN ELECTRIC ARC OR ARCS FOR MELTING AND EXTRACTION OF METAL FROM ORE.
APPLICATION FILED APR. 3, 1911.

1,097,336.

Patented May 19, 1914.

3 SHEETS—SHEET 3.

Witnesses
E. Heymann
M. Schmid

Inventor:
Peter Krefting
by B. Singer atty

UNITED STATES PATENT OFFICE.

PETER KREFTING, OF CHRISTIANIA, NORWAY.

ELECTRIC FURNACE WORKING WITH AN ELECTRIC ARC OR ARCS FOR MELTING AND EXTRACTION OF METAL FROM ORE.

1,097,336.      Specification of Letters Patent.    Patented May 19, 1914.

Application filed April 3, 1911. Serial No. 618,648.

*To all whom it may concern:*

Be it known that I, PETER KREFTING, a subject of the King of Norway, residing at Christiania, Norway, have invented certain new and useful Improvements in Electric Furnaces Working with an Electric Arc or Arcs for Melting and Extraction of Metal from Ore; and I do hereby declare that the following is a full, clear, and exact description of the same, reference being had to the accompanying drawings, forming a part hereof.

The present invention relates to improvements in electric furnaces working with an electric arc or arcs for melting and extracting metal from ore.

The object of the invention is to provide for maintaining a predetermined temperature in the melting chamber and also means for insuring the regular supply of material (charge) into said chamber. With these and other objects in view I provide the furnace with a superposed shaft for containing the charge of ore and I further provide one (or more) flue for the escape of the vapors or gases said flue being provided with closing means which is adjustable so as to open automatically at a pressure in the melting chamber higher than the pressure, which is most suitable for the process. I further arrange the shaft with branch passages to supply the material into the melting chamber on both sides of the arc and in each of said passages means are provided for the propulsion of the material, and the mouths of said passages are provided with nozzles for the distribution of the material in the chamber.

On the appended drawings are illustrated furnaces constructed in accordance with the present invention.

Figure 4:
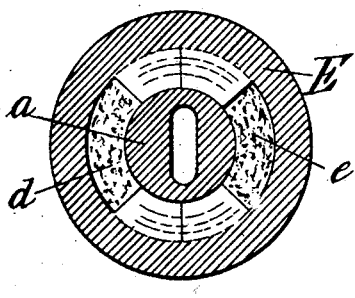
Figure 9:
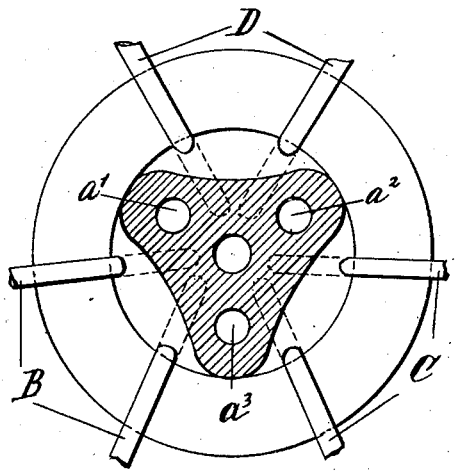
Figure 3:
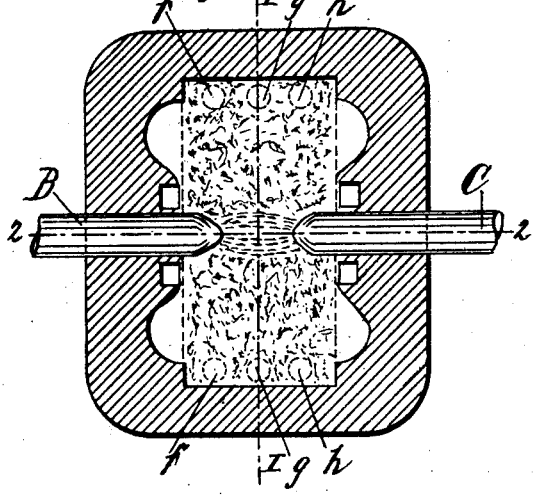
Figure 7:
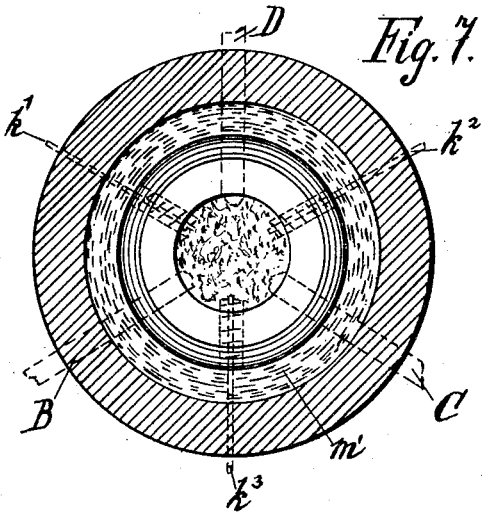
Figure 6:
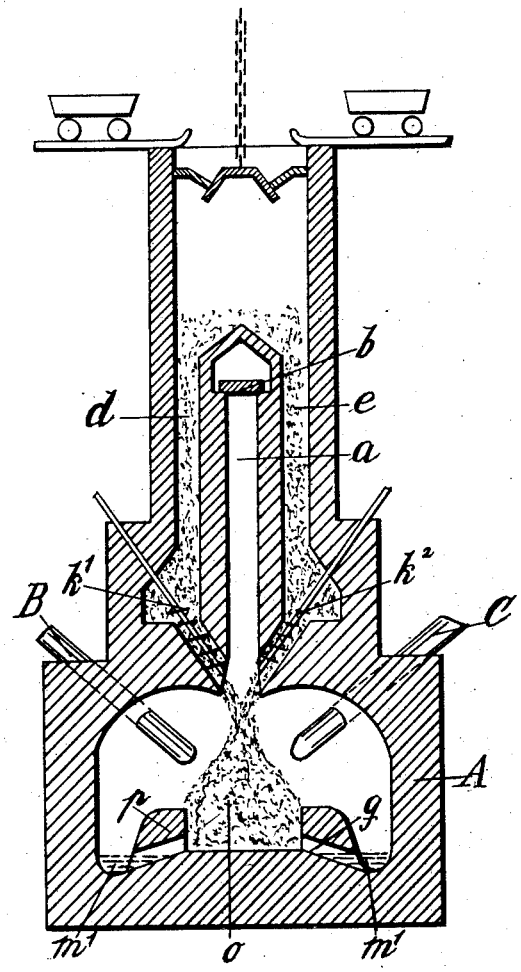
Figure 8:
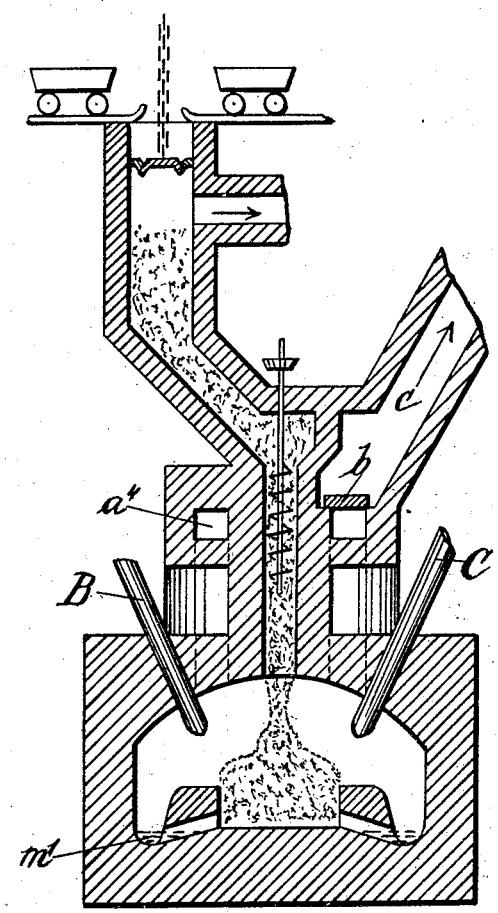

Figure 1 is vertical section on line 1—1 in Fig. 3; Fig. 2 is vertical section on line 2—2 in Fig. 3; Fig. 3 is horizontal section on line 3—3 in Fig. 2; Fig. 4 is section of shaft on line 4—4 in Fig. 1; Fig. 5 shows the lower portion of conveyer with nozzles in section; Fig. 6 represents vertical section of a furnace arranged with three electrodes; Fig. 7 is horizontal section of Fig. 6, Figs. 8 and 9 show the arrangement of three electrode pairs and three flues with a central shaft for the charge.

A is a furnace, B and C the electrodes fed from a suitable source of current.

$m$ is the sump and $n$ is the taphole for drawing off the melted product.

E is the shaft for the ore-charge. Within the shaft is a flue (stack) $a$ leading from the top of the melting chamber a suitable distance up through the shaft, and from the top of said flue a passage $c$ leads to the outside of the shaft. The valve consists of a plate $b$ covering the top of the flue $a$, said plate being adjusted to open automatically at a certain pressure in the melting chamber. If the ore under treatment contains volatile metals the passage $c$ is put in communication with a condenser for collecting the metallic vapors. If the ore does not contain such volatile metals, the passage $c$ opens into the air or it leads to a place, where the gases may be utilized. The shaft has an outlet $i$ for aqueous vapors and the like, Fig. 2. At the bottom the said shaft is divided in two branches $d$ and $e$, Fig. 1, and each of the said branches is divided into three branches $f$, $g$ and $h$, Fig. 5, forming nozzles for distributing the material (ore) in the melting chamber.

$k$ and $l$ are conveyers for the mechanical propulsion of the ore through the said nozzles, the ore gathering in heaps on each side of the electric arc.

The above described furnace is arranged for single-phase alternating current; in case the furnace is to be fed with two-, three- or multi-phase current the material must be introduced in the middle of the melting chamber and the electrodes are arranged singly or in pairs around the material so as to form a circle of arcs.

Figs. 6 and 7 show an embodiment of my improved furnace having three electrodes B, C, D and three inclined conveyers $k^1$, $k^2$, $k^3$ introducing the material into the melting chamber as a thin jet. For the collection of the material the bottom of the furnace is provided with an elevation, which is surrounded by a wall $p$; $q$ are passages through which the melting product may run off into the sump $m^1$.

In Figs. 8 and 9 I show a modification of my furnace in which I provide three electrode-pairs B, C, D and three flues $a^1$, $a^2$, $a^3$ arranged outside the shaft, said flues communicating with a channel $a^4$. The central shaft is provided with a conveyer.

The essential feature of the invention is the arrangement of the flue for the escape of the vapors and gases, said flue being provided with closing means which opens automatically at a certain pressure in order to maintain a predetermined temperature in the melting chamber and further the hot gases will preheat and dry the ore charge in the shaft; and further essential features of the invention are the vertical or inclined conveyers respectively for the propulsion for the charge and also the arrangement of the electrodes singly or in pairs.

The furnace is in the first place intended for extraction of metal contained in complex ores, consisting of $ZnS+PbS—CuS—AgS$, but can also be used for other ores. Through the flue $c$ (Fig. 2) the furnace is in communication with a system of tubes for the condensation of vaporized zinc and lead. The effect of the furnace is dependent on the nature of the charge, or in other words of the kind of flux which is added. As such flux may be mentioned peroxid of iron, lime, alumina, magnesia, feldspar and the like; as fuel may be used cheap coal, anthracite coal powder or other scrap coal. The furnace may as well be used as calcining furnace as for melting the metals from the ore.

Having thus fully described my invention, what I claim as new and desire to secure by Letters Patent, is:

1. An electric furnace comprising a closed melting chamber, a vertical charging shaft above the chamber, provided with a plurality of extensions with charging apertures, said apertures being normally closed by the charging material, a flue leading from the melting chamber through the material being charged, said flue extending through the shaft, and a plurality of electrodes extending into the melting chamber substantially as described.

2. An electric furnace comprising a closed melting chamber, a vertical charging shaft above the chamber provided with a plurality of extensions with charging apertures, said apertures being normally closed by the charging material, a flue leading from the melting chamber through the material being charged and a plurality of conveyers located in extensions of the vertical shaft for charging the material from the vertical shaft into the melting chamber.

In testimony whereof I affix my signature in presence of two witnesses.

PETER KREFTING.

Witnesses:
C. ANT. ABRAHAMSEN,
H. W. K. SCHLYTTER.

---

Copies of this patent may be obtained for five cents each, by addressing the "Commissioner of Patents, Washington, D. C."